(12) United States Patent
Nojiri

(10) Patent No.: US 11,698,619 B2
(45) Date of Patent: Jul. 11, 2023

(54) MACHINING STEP MONITORING APPARATUS AND MACHINING STEP MONITORING METHOD

(71) Applicant: Panasonic Intellectual Property Management Co., Ltd., Osaka (JP)

(72) Inventor: Naoki Nojiri, Osaka (JP)

(73) Assignee: PANASONIC INTELLECTUAL PROPERTY MANAGEMENT CO., LTD., Osaka (JP)

(*) Notice: Subject to any disclaimer, the term of this patent is extended or adjusted under 35 U.S.C. 154(b) by 0 days.

(21) Appl. No.: 17/663,049

(22) Filed: May 12, 2022

(65) Prior Publication Data
US 2022/0382244 A1 Dec. 1, 2022

(30) Foreign Application Priority Data
May 27, 2021 (JP) .................................. 2021-089469

(51) Int. Cl.
G05B 19/406 (2006.01)
G05B 19/408 (2006.01)
G05B 19/4103 (2006.01)

(52) U.S. Cl.
CPC ......... G05B 19/406 (2013.01); G05B 19/408 (2013.01); G05B 19/4103 (2013.01)

(58) Field of Classification Search
None
See application file for complete search history.

(56) References Cited

U.S. PATENT DOCUMENTS

2012/0078670 A1* 3/2012 Yamamura ......... G05B 19/4184
705/7.11

FOREIGN PATENT DOCUMENTS

| JP | 9-120365 | 5/1997 |
| JP | 2001-113399 | 4/2001 |
| JP | 2012-230043 | 11/2012 |
| JP | 2020-086843 | 6/2020 |
| WO | 2019/207718 | 10/2019 |

* cited by examiner

Primary Examiner — Ryan A Jarrett
(74) Attorney, Agent, or Firm — Wenderoth, Lind & Ponack, L.L.P.

(57) ABSTRACT

A machining step monitoring apparatus includes a data segmentation unit, a data length adjuster, and a determination processor. The data segmentation unit defines machining start time and machining end time of each single cycle, and segments, from a first physical quantity that temporally changes during the cycle machining in the machining machine, first measurement data indicating the first physical quantity from the machining start time to the machining end time for each single cycle. The data length adjuster generates the second measurement data by adjusting the data length of the first measurement data to match with the data length of the determination reference data indicating, as a reference, a change in the first physical quantity during the single cycle when the machining machine is normally operating. The determination processor compares the second measurement data with the determination reference data to determine whether the machining machine is normally operating.

15 Claims, 10 Drawing Sheets

MACHINING STEP MONITORING APPARATUS AND MACHINING STEP MONITORING METHOD

BACKGROUND

1. Technical Field

The present disclosure relates to a machining step monitoring apparatus and a machining step monitoring method.

2. Description of the Related Art

In the fields of press machining, injection molding, numerically controlled (NC) machining, industrial robots, and the like, machining that repeats a relatively short single cycle has been used. There has been proposed a technique in which a state of machining by such a machining machine is detected by a sensor, and whether the machining machine is normally operating is determined by analyzing time-series machining sensing data that is a detection result.

For example, a method for creating determination data for manufacturing apparatus diagnosis disclosed in PTL 1 internally divides a state quantity representing normal operation of a facility and a state quantity representing abnormal operation to obtain a determination value. The determination value is used for determination of machining sensing data, thereby providing an accurate determination result. The data analysis apparatus and the method for analyzing data disclosed in PTL 2 provide a method for detecting an abnormality by making the positional relationship between the master waveform and the waveform of the machining sensing data different in such a manner that the similarity therebetween is maximized, and making the positional relationship between the reference waveform and the waveform of the machining sensing data appropriate.

CITATION LIST

Patent Literature

PTL 1: Unexamined Japanese Patent Publication No. 9-120365

PTL 2: Unexamined Japanese Patent Publication No. 2020-86843

SUMMARY

One aspect of the present disclosure provides a machining step monitoring apparatus configured to monitor a machining machine that performs cycle machining that repeats a single cycle, the machining step monitoring apparatus configured to determine whether the machining machine is operating normally, the machining step monitoring apparatus including: a data segmentation unit configured to define machining start time and machining end time of each single cycle, the data segmentation unit configured to segment, from a first physical quantity that temporally changes during the cycle machining in the machining machine, first measurement data indicating the first physical quantity from the machining start time to the machining end time for each single cycle; a data length adjuster configured to generate second measurement data by adjusting a data length of the first measurement data to match with a data length of determination reference data indicating, as a reference, a change in the first physical quantity during the single cycle in a case where the machining machine is normally operating; and a determination processor configured to compare the second measurement data with the determination reference data to determine whether the machining machine is normally operating.

Another aspect of the present disclosure provides a machining step monitoring method of monitoring a machining machine that performs cycle machining that repeats a single cycle, and of determining whether the machining machine is operating normally, the machining step monitoring method including: sequentially acquiring a first physical quantity that temporally changes during the cycle processing in the machining machine; defining machining start time and machining end time of each single cycle, and segmenting, from the first physical quantity, first measurement data indicating the first physical quantity from the machining start time to the machining end time for each single cycle; generating second measurement data by adjusting a data length of the first measurement data to match with a data length of determination reference data indicating, as a reference, a change in the first physical quantity during the single cycle in a case where the machining machine is normally operating; and comparing the second measurement data with the determination reference data to determine whether the machining machine is normally operating.

DETAILED DESCRIPTIONS (Background to the Present Disclosure)

In the related art, when fluctuation occurs in machining time of cycle machining using a machining machine, there is a possibility that an operational abnormality of the machining machine cannot be accurately detected. Hereinafter, this problem will be described.

An example of cycle machining that repeats the same operation is a machining method in which a cycle of machining by applying a load to a workpiece made of metal or the like is repeated, and is, for example, press machining of punching the workpiece. In a press machine used for press machining, a metal mold in which a tool such as a punch or a die is incorporated is set. The press machine repeatedly punches a workpiece into a predetermined shape while feeding the workpiece by slider operation that vertically operates at a substantially constant cycle.

The press machine includes, for example, a crank press machine having a crank controlled to rotate at a constant period. In the crank press machine, when high-speed machining is required to improve productivity, shots per minute (SPM) indicating the number of times of machining per minute is set to a high value. The press machine rotates the crank at a high speed such that a set SPM is obtained, converts this rotational motion into vertical motion of the slide member (slider), and machines the workpiece at a high speed.

However, even when control is attempted to perform machining at a constant speed, a difficulty lies in keeping the machining speed constant with high accuracy. Thus, there is a problem that fluctuation occurs in the machining speed. As a result of occurrence of the fluctuation in the machining speed, fluctuation also occurs in the machining time. As the size of the press machine increases, the energy required for control increases, and it becomes difficult to maintain the speed with high accuracy. Therefore, the fluctuation in the machining speed becomes noticeable as the size of the press machine increases. In particular, immediately after the press machine is started, the slider and the heavy metal mold attached to the slider are required to be moved from a stopped state, and thus, the slider speed becomes lower than the set SPM.

Figure 10:
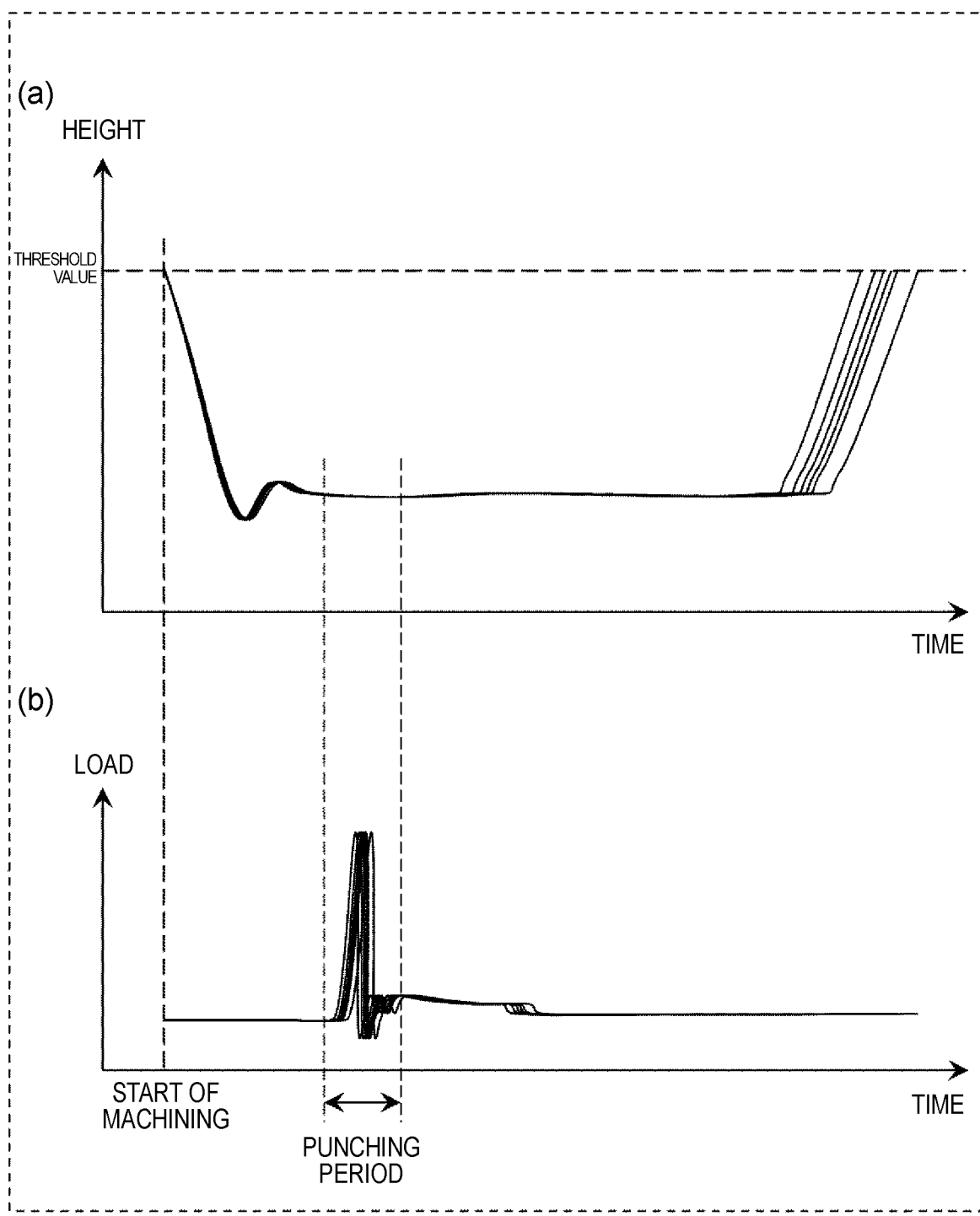
FIG. 10 is a graph indicating waveforms of sensing data in punching by a known press machine.

FIG. 10 is a graph illustrating waveforms of sensing data in punching by a known press machine. Part (a) of FIG. 10 is a graph indicating a temporal change in the height of the stripper plate (for example, the height thereof from the die plate) measured by the height sensor. Part (b) of FIG. 10 is a graph indicating a temporal change in the load [N] applied to the punch, which is measured by a load sensor. The data groups in part (a) of FIG. 10 and part (b) of FIG. 10 are obtained by superimposing a plurality of pieces of data acquired by a sensor attached to a metal mold of the press machine.

The acquisition of the data in part (a) of FIG. 10 and part (b) of FIG. 10 is started at machining start time in which the height of the stripper plate in part (a) of FIG. 10 falls below a start threshold value, and is ended at machining end time in which the height of the stripper plate exceeds an end threshold value. In part (a) of FIG. 10, the start threshold value and the end threshold value are set to the identical threshold value, but may be set to values different from one another. Note that FIG. 10 is a graph in which a plurality of pieces of measurement data are provided in such a manner that the positions at the machining start time of these data are aligned and superimposed.

In FIG. 10, only the measurement data in the normal machining state in which the machining machine is normally performing cycle machining is displayed. As can be seen from FIG. 10 that the time point of the end of machining is not constant even in a normal machining state. This is because the above-described fluctuation in the machining time causes a change in the length of the time of the measurement data, namely, the length of the machining time. In addition, in the load data of the punch indicated in part (b) of FIG. 10, the punching period in which the workpiece is punched is short, and the load data is accompanied with a steep change in the punching period. Therefore, even in the normal machining state, a temporal positional shift appears in the waveform shape during the punching period, which characterizes the punching, among the plurality of pieces of load data. Such a positional shift further appears with a large variation in the physical quantity direction during the period when the SPM is not stable immediately after the start of the press machine.

In the related art as proposed in PTL 1 in which an abnormality is detected based on whether the value falls within the range of the reference value, it is necessary to set the reference value to have a wide range in consideration of the variation in the waveform of the normal machining state. Therefore, a minute abnormality cannot be detected.

In addition, even in the related art as proposed in PTL 2 in which the measured waveform is shifted in the time axis direction such that the position of the peak is identical to that in the reference waveform, the reference waveform and the measured waveform can be aligned in part, but cannot be aligned as a whole. Furthermore, in the case of a physical quantity in which a large peak appears, the positional relationship can be aligned although alignment is applicable to only a part thereof. However, in the case of a physical quantity in which a large peak does not appear, for example, in the case of various physical quantities measured by various sensors, the positional relationship cannot be aligned.

Moreover, in the related art, it is necessary to set a sampling frequency in analog-to-digital (A/D) conversion for converting an analog signal into a digital signal to be high to make sampling fine, in order to accurately capture a steep change in load data during a punching period. However, when the sampling frequency is increased, the sampling also becomes finer for the load data in the time domain other than the punching period in which the change is slow and the height data of the stripper plate, in which the change is slow over the whole, and the volume of data increases. Therefore, there is a problem that data throughput necessary for detecting an abnormality increases and a processing time increases.

An object of the present disclosure is to provide a machining step monitoring apparatus and a machining step monitoring method, capable of more accurately determining whether a machining machine is operating normally than those in the related art, even when fluctuation occurs in the machining time of each single cycle in cycle machining. A machining step monitoring apparatus according to exemplary embodiments described below solves the above problems.

Hereinafter, exemplary embodiments will be described in detail with reference to the drawings as appropriate. However, unnecessarily detailed description may be omitted. For example, detailed description on already known matters and duplicated description on substantially identical configurations may be omitted. This is to avoid the following description from being unnecessarily redundant, and to help those skilled in the art easily understand the description. Note that the applicant provides the accompanying drawings and the following description in order to allow those skilled in the art to fully understand the present disclosure, and do not intend to limit the subject matter as described in the claims.

First Exemplary Embodiment

[Configuration]

Figure 1:
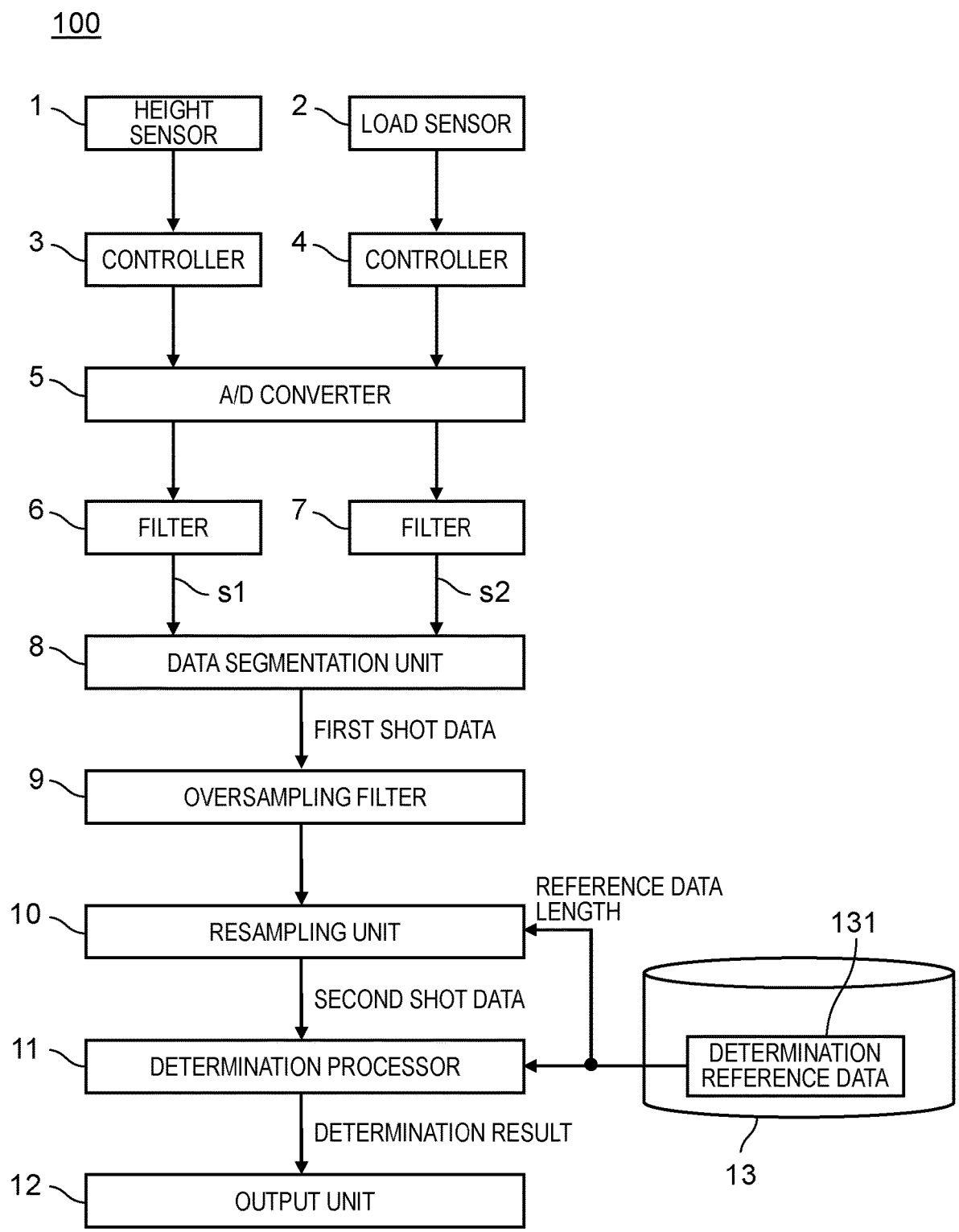
FIG. 1 is a block diagram illustrating a configuration example of a machining step monitoring apparatus according to a first exemplary embodiment of the present disclosure.

FIG. 1 is a block diagram illustrating a configuration example of machining step monitoring apparatus 100 according to a first exemplary embodiment of the present disclosure. Machining step monitoring apparatus 100 includes height sensor 1, load sensor 2, controllers 3, 4, A/D converter 5, and filters 6, 7. Height sensor 1 and load sensor 2 are attached to a machining machine that performs cycle machining. The machining machine is, for example, a crank press machine in which a metal mold incorporating a tool such as a punch or a die is set.

Height sensor 1 is, for example, an optical, radio, or ultrasonic distance sensor. In the present exemplary embodiment, height sensor 1 detects the height of the stripper plate of the press machine, for example, the distance between the die plate and the stripper plate. Controller 3 outputs a voltage signal corresponding to the height detected by height sensor 1. Load sensor 2 is, for example, a piezoelectric force sensor or an electric force sensor such as a strain gauge-based sensor, and detects a load applied to a punch of a press machine at the time of punching out a workpiece. Controller 4 outputs a voltage signal corresponding to the load detected by load sensor 2. The height detected by height sensor 1 and the load detected by load sensor 2 are examples of a "first physical quantity" in the present disclosure. The height detected by height sensor 1 can also be an example of the "second physical quantity" in the present disclosure. The second physical quantity is information indicating a position of a member of the machining machine, for example, a stripper plate, which moves to apply a load to the workpiece during a single cycle of the machining machine. Controllers 3, 4 are examples of a "physical quantity acquisition unit" in the present disclosure.

A/D converter 5 converts the input voltage signal into a digital signal. A/D converter 5 operates at sampling frequency Fs (samples/second). That is, A/D converter 5 converts a voltage signal received from controller 3, 4 at a sampling period of a 1/Fs (seconds) interval into a digital signal and outputs the digital signal.

Filters 6, 7 respectively perform filter processing on a digital signal corresponding to height sensor 1 and a digital signal corresponding to load sensor 2. Filters 6, 7 each include a low-pass filter (LPF), a median filter, and the like, and have a function of removing noise from input data. Filters 6, 7 respectively remove noise and the like of height sensor 1 and load sensor 2 themselves, and respectively remove noise and the like mixed in the path from the outputs of height sensor 1 and load sensor 2 to the inputs to filters 6, 7. At least one of filters 6, 7 may be omitted when the noise is small and thus can be ignored. In the case of omission, the phases between the signals are aligned by using, for example, a delay device to prevent only one of the signals from being delayed.

Machining step monitoring apparatus 100 further includes data segmentation unit 8, oversampling filter 9, resampling unit 10, determination processor 11, output unit 12, and storage 13.

Data segmentation unit 8 executes processing for aligning a plurality of signals s1 originating from height sensor 1 and a plurality of signals s2 originating from load sensor 2 such that the machining start conditions and the machining end conditions for those signals match with one another to make a first shot data. Details of the data segmentation processing executed by data segmentation unit 8 will be described later. Data segmentation unit 8 outputs the first shot data to oversampling filter 9. The first shot data is an example of "first measurement data" in the present disclosure.

Oversampling filter 9 oversamples each of the signals in the digital signal group included in the input first shot data with a sampling frequency of 8 Fs. The digital signal group included in the input first shot data includes a signal originating from height sensor 1 and a signal originating from load sensor 2. Details of oversampling (it may also be referred to as upsampling) performed by oversampling filter 9 will be described later. Oversampling filter 9 is an example of a "data interpolator" in the present disclosure. Oversampling filter 9 is, for example, a low-pass filter, and more specifically, a finite impulse response (FIR) filter.

Storage 13 is a recording medium that records various types of information including a program and data necessary to implement functions of machining step monitoring apparatus 100. Storage 13 may be, for example, any of a hard disk drive (HDD), an optical drive, or a solid state drive (SSD). Storage 13 may be any of a built-in storage, an external storage, or a network-attached storage (NAS), or may be implemented by cloud computing.

Storage 13 stores, for example, determination reference data 131. Determination reference data 131 is information indicating, as a reference, a change in measurement data during the single cycle in the case where the machining machine is normally operating. Determination reference data 131 is, for example, waveform data such as height data and load data in a normal machining state, and serves as a reference for determination of abnormality detection or the like. Determination reference data 131 may include accompanying data such as an upper limit value and a lower limit value of such waveform data. Determination reference data 131 includes a reference data length indicating a data length of determination reference data 131. The "data length" represents, for example, a length of data in terms of a number of samples. For example, the larger the number of samples, the longer the data length.

The first shot data having passed through oversampling filter 9 and the reference data length based on determination reference data 131 are input to resampling unit 10. Resampling unit 10 executes, on the first shot data having passed through oversampling filter 9, resampling processing of matching the data length of the first shot data with the reference data length, and generates second shot data. Resampling unit 10 outputs the second shot data to determination processor 11. Resampling unit 10 is an example of a "data length adjuster" in the present disclosure, and the second shot data is an example of "second measurement data" in the present disclosure.

Determination processor 11 executes determination processing of abnormality detection or the like based on second shot data and outputs a determination result. For example, determination processor 11 compares the second shot data with determination reference data 131, and determines that there is an abnormality, when the comparison result is not fall within a range between the upper limit value and the lower limit value, inclusive.

Output unit 12 is an output interface for outputting a determination result. Output unit 12 is, for example, a light emitting device that emits light to notify a user of certain information, such as a light-emitting diode (LED). Output unit 12 may be a display device such as a liquid crystal display or an organic electro-luminescence (EL) display capable of displaying information. Output unit 12 may be a sound output device that notifies the user of information by sound, such as a speaker. Output unit 12 may be a communication interface for enabling communication connection between machining step monitoring apparatus 100 and an external device. Such a communication interface performs communication in accordance with an existing wired communication standard or wireless communication standard.

Each component of machining step monitoring apparatus 100 may be implemented by a circuit corresponding to each component, or may be implemented by an arithmetic circuit. Such an arithmetic circuit includes a central processing unit (CPU), a random access memory (RAM), a read only memory (ROM), and the like. The arithmetic circuit controls operation of machining step monitoring apparatus 100, for example, operation of data segmentation unit 8, oversampling filter 9, resampling unit 10, and determination processor 11, in accordance with information processing. Such information processing is implemented by the arithmetic circuit executing a program. The arithmetic circuit may be implemented by one or a plurality of dedicated processors. In addition, regarding the components of the arithmetic circuit, omission, replacement, and addition of functions may be appropriately made in accordance with an exemplary embodiment.

Although FIG. 1 illustrates various components that machining step monitoring apparatus 100 can have, it is not essential for machining step monitoring apparatus 100 to have all of the components. It is sufficient for machining step monitoring apparatus 100 to have at least data segmentation unit 8, oversampling filter 9, resampling unit 10, determination processor 11, and determination reference data 131 during operation. In other words, machining step monitoring apparatus 100 may not include some or all of sensors 1 and 2, controllers 3 and 4, A/D converter 5, filters 6 and 7, and output unit 12. It is sufficient that signals from sensors 1 and 2, controllers 3 and 4, A/D converter 5, and filters 6 and 7 can be acquired during operation of machining step monitoring apparatus 100.

[Operation]

Figure 2:
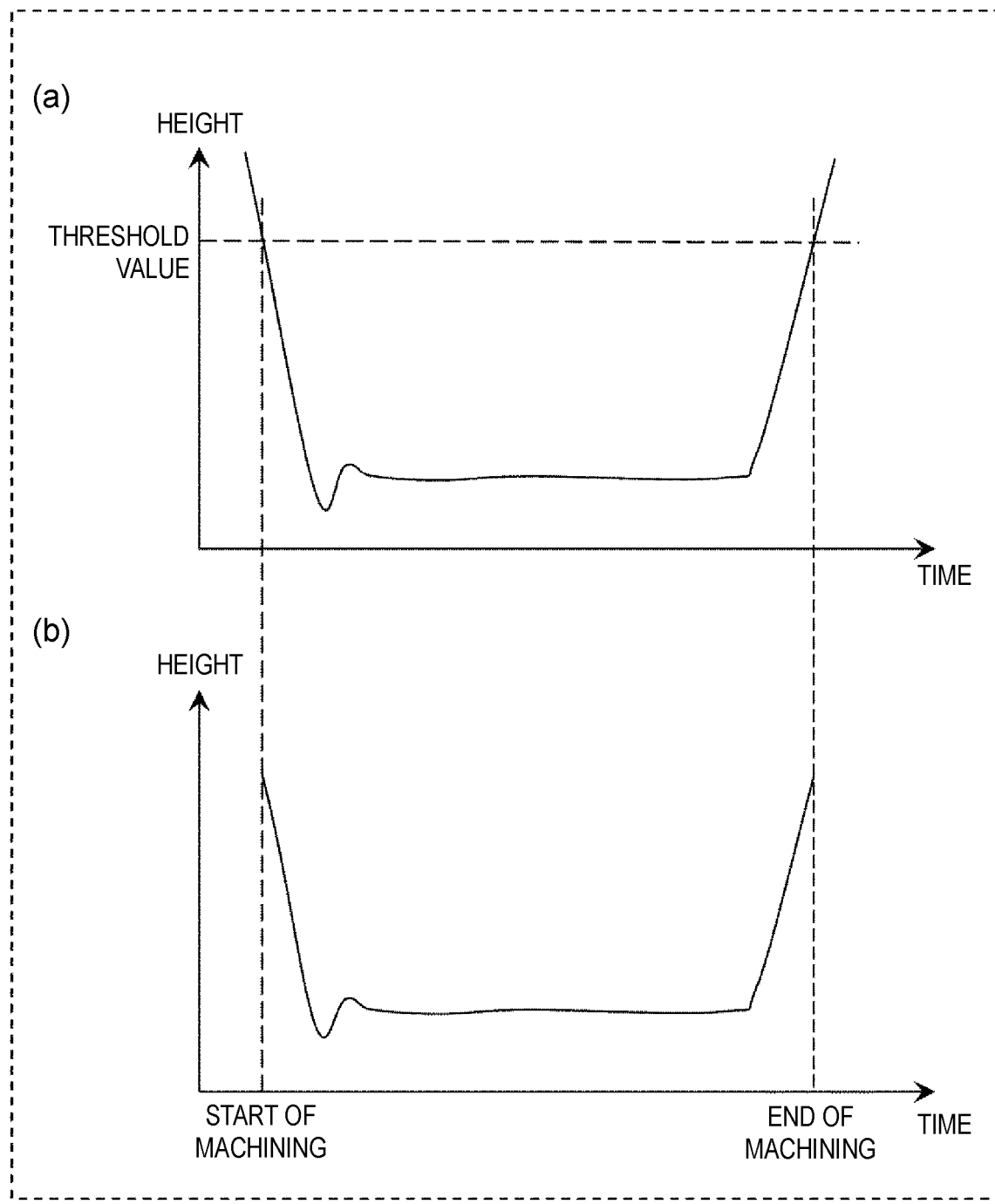
FIG. 2 is a schematic diagram illustrating data segmentation processing executed by a data segmentation unit in FIG. 1.

FIG. 2 is a schematic diagram illustrating data segmentation processing executed by data segmentation unit 8 in FIG. 1. Part (a) of FIG. 2 illustrates signal s1 originating from height sensor 1 and being input to data segmentation unit 8. Signal s1 is a signal in a state before being segmented by data segmentation unit 8. Part (b) of FIG. 2 illustrates a signal output from data segmentation unit 8 corresponding to signal s1. The signal illustrated in part (b) of FIG. 2 is generated as a result of executing the data segmentation processing by data segmentation unit 8 on signal s1. The signal illustrated in FIG. 2 is a discrete signal because the signal passes through A/D converter 5. However, in FIG. 2, schematically, the signal is continuously illustrated.

Specifically, data segmentation unit 8 monitors signal s1 originating from height sensor 1 and illustrated in part (a) of FIG. 2, and defines machining start time when the intensity of signal s1 falls below the start threshold value and machining end time when the intensity exceeds the end threshold value. Next, data segmentation unit 8 segments a waveform from the machining start time to the machining end time for signal s1. In part (a) of FIG. 2, the start threshold value and the end threshold value are set to the identical threshold value, but may be set to values different from each other.

In FIG. 2, only the data segmentation processing for signal s1 originating from height sensor 1 is illustrated, but data segmentation unit 8 also executes data segmentation processing for signal s2 originating from load sensor 2. That is, data segmentation unit 8 segments, for signal s2, a waveform from the machining start time to the machining end time, both of which are identical to those of signal s1. Signals s1, s2 segmented by data segmentation unit 8 constitute the first shot data. As described above, since signals s1, s2 are aligned into the data from the identical machining start time to the identical machining end time, the data lengths of all the waveforms constituting the first shot data are identical to one another.

Figure 3:
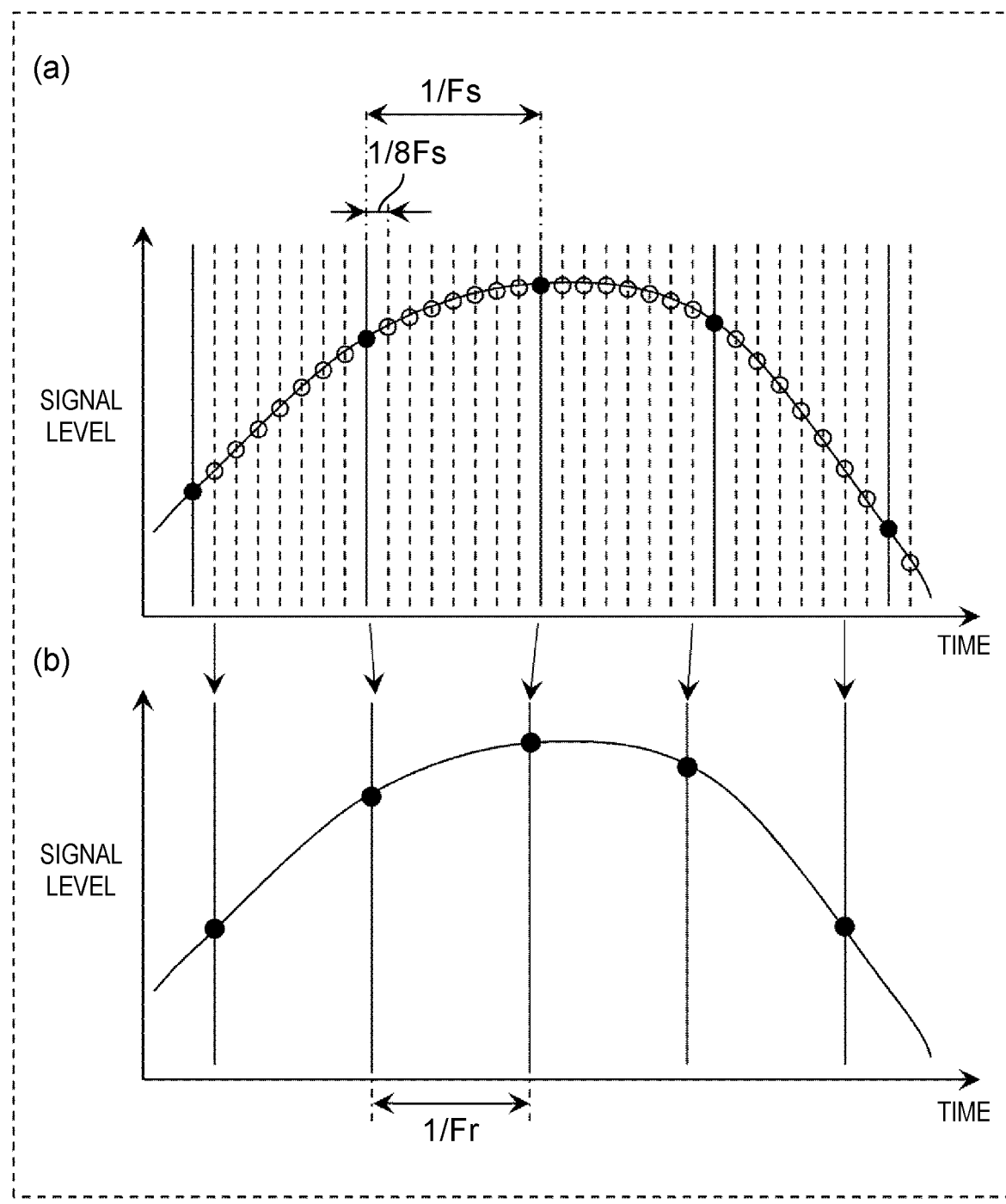
FIG. 3 is a schematic diagram for explaining oversampling processing executed by an oversampling filter in FIG. 1 and resampling processing executed by a resampling unit in FIG. 1.

FIG. 3 is a schematic diagram for explaining oversampling processing executed by oversampling filter 9 in FIG. 1 and resampling processing executed by resampling unit 10 in FIG. 1. Part (a) of FIG. 3 illustrates an example of shot data output from oversampling filter 9. Part (b) of FIG. 3 illustrates an example of second shot data output from resampling unit 10.

In part (a) of FIG. 3, sampling points sampled with sampling frequency Fs are denoted by black circle symbols, and oversampled sampling points are denoted by white circle symbols. Correspondingly, in part (a) of FIG. 3, the measurement sampling timing with sampling frequency Fs is denoted by solid lines, and the oversampling timing with an eight-times sampling frequency of 8 Fs is denoted by broken lines.

As described above, oversampling filter 9 is, for example, a low-pass filter based on the FIR. Oversampling filter 9 preferably does not cause, in the output signal, a phase delay with respect to the input signal. In addition, the filter constant of oversampling filter 9 is preferably set such that the cutoff frequency is substantially identical to, for example, half of sampling frequency Fs (Nyquist frequency). Here, sampling frequency Fs can be obtained as the reciprocal of the reference data length.

As illustrated in part (a) of FIG. 3, between sampling points (black circle symbols) sampled with sampling frequency Fs, a group of seven points (white circle symbols) on a smooth curve in which high frequency components equal to or higher than the cutoff frequency are cut off are interpolated by oversampling filter 9.

Next, resampling unit 10 executes, on the first shot data having passed through oversampling filter 9 as in part (a) of FIG. 3, resampling processing of matching the data length of the first shot data with the reference data length, and generates the second shot data as illustrated in part (b) of FIG. 3. Resampling unit 10 resamples the measurement sampling timing of a period of 1/Fs denoted by the solid lines in part (a) of FIG. 3 to the determination sampling timing denoted by solid lines in part (b) of FIG. 3. In part (b) of FIG. 3, the resampling frequency is denoted by Fr. The determination sampling timing in part (b) of FIG. 3 is obtained as the reciprocal of the reference data length.

Note that FIG. 3 illustrates a case where the machining time in the first shot data, namely, the data length of the first shot data is slightly shorter than the machining time in determination reference data 131, namely, the reference data length of determination reference data 131. The reference data length and the data length of the first shot data do not necessarily match with each other due to the temporal fluctuation in the machining described above even when the respective sampling periods are identical to each other, and the data length of the first shot data may be shorter than the reference data length as in the example illustrated in FIG. 3.

Given this situation, resampling unit 10 executes resampling processing of matching the data lengths of both data. Specifically, the sampling period of the first shot data is adjusted such that the machining start time and the machining end time of the first shot data respectively match with the machining start time and the machining end time of determination reference data 131. As a result, the data length of the first shot data and the reference data length of determination reference data 131 become identical to each other. In the example illustrated in FIG. 3, the machining start time and the machining end time of the first shot data are adjusted to respectively match with the machining start time and the machining end time of determination reference data 131. As a result, in the present exemplary embodiment, the first shot data is converted such that the measurement sampling timing interval denoted by the solid lines in part (a) of FIG. 3 is slightly widened.

Then, the sampling point temporally closest to the determination sampling timing denoted by the solid line in part (b) of FIG. 3 is selected from the sampling points oversampled eight times, that is, from the black circle symbols and the white circle symbols in part (a) of FIG. 3. As a result of this process, the resampled second shot data, which is indicated by the black circle symbols in part (b) of FIG. 3, is made. In this way, it is possible to acquire an interpolated value with a small error, corresponding to the determination sampling timing denoted by the solid line in part (b) of FIG. 3.

By executing the oversampling processing in this manner, it becomes unnecessary to set sampling frequency Fs in the A/D conversion by A/D converter 5 to be excessively greater than the speed of the change in physical quantity for the resampling processing. Accordingly, sampling frequency Fs converted by A/D converter 5 can be suppressed to a low level. Thus, the hardware configuration can be simplified, the volume of data to be processed can be reduced, and the determination processing can be speeded up. Further, resampling unit 10 can convert the first shot data into the second shot data whose length matches with the reference data length, and always match the machining start time with each other and match the machining end time each other even when the data lengths are not constant due to the fluctuation in the machining time.

Figure 4:
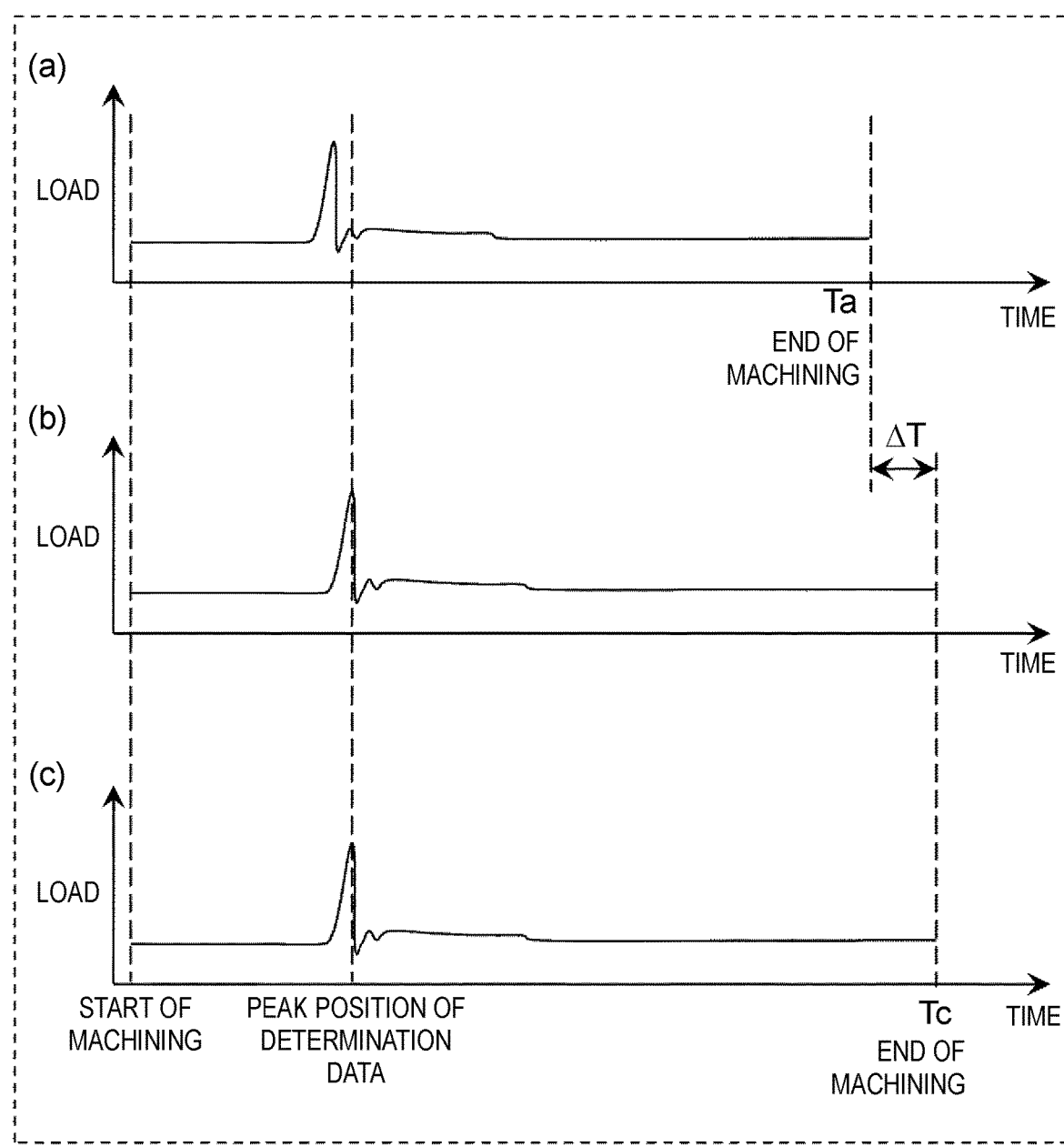
FIG. 4 is a schematic diagram illustrating shot data before and after resampling processing executed by the resampling unit in FIG. 1.

FIG. 4 is a schematic diagram illustrating shot data before and after resampling processing executed by resampling unit 10 in FIG. 1. Part (a) of FIG. 4 illustrates shot data before resampling by resampling unit 10. The shot data in part (a) of FIG. 4 is signal information originating from load sensor 2. Part (b) of FIG. 4 illustrates the second shot data obtained by executing the resampling processing by resampling unit 10 on the shot data in part (a) of FIG. 4. Part (c) of FIG. 4 illustrates an example of determination reference data 131. The data illustrated in parts (a), (b), and (c) of FIG. 4 are, for example, time-series data arranged at equal intervals in the time axis direction.

When the machining start time in the shot data in part (a) of FIG. 4 is matched with the machining start time in determination reference data 131 in part (c) of FIG. 4, machining time difference ΔT due to temporal fluctuation in machining arises between machining end time Ta in the shot data in part (a) of FIG. 4 and machining end time Tc in determination reference data 131 in part (c) of FIG. 4. Further, when the shot data in part (a) of FIG. 4 is compared with determination reference data 131 in part (c) of FIG. 4, the number of samples from the start of the machining to the end of the machining is also different.

On the other hand, as illustrated in part (b) of FIG. 4, the second shot data obtained by executing the resampling processing by resampling unit 10 has the data length identical to that of determination reference data 131 in part (c) of FIG. 4, and the number of samples from the start of the machining to the end of the machining of both data is also identical to each other. In this manner, resampling unit 10 matches the data length of the second shot data subject to determination with the data length of determination reference data 131 that is the basis of the determination. As a result, resampling unit 10 can match the peak position appearing in the second shot data with the peak position in determination reference data 131. Here, the peak position is, for example, the time at which a peak appears in the data, and represents time based on the machining start time. Therefore, even when fluctuation occurs in the machining time, determination processor 11 can determine the second shot data based on the comparison with determination reference data 131 with high accuracy.

Figure 5:
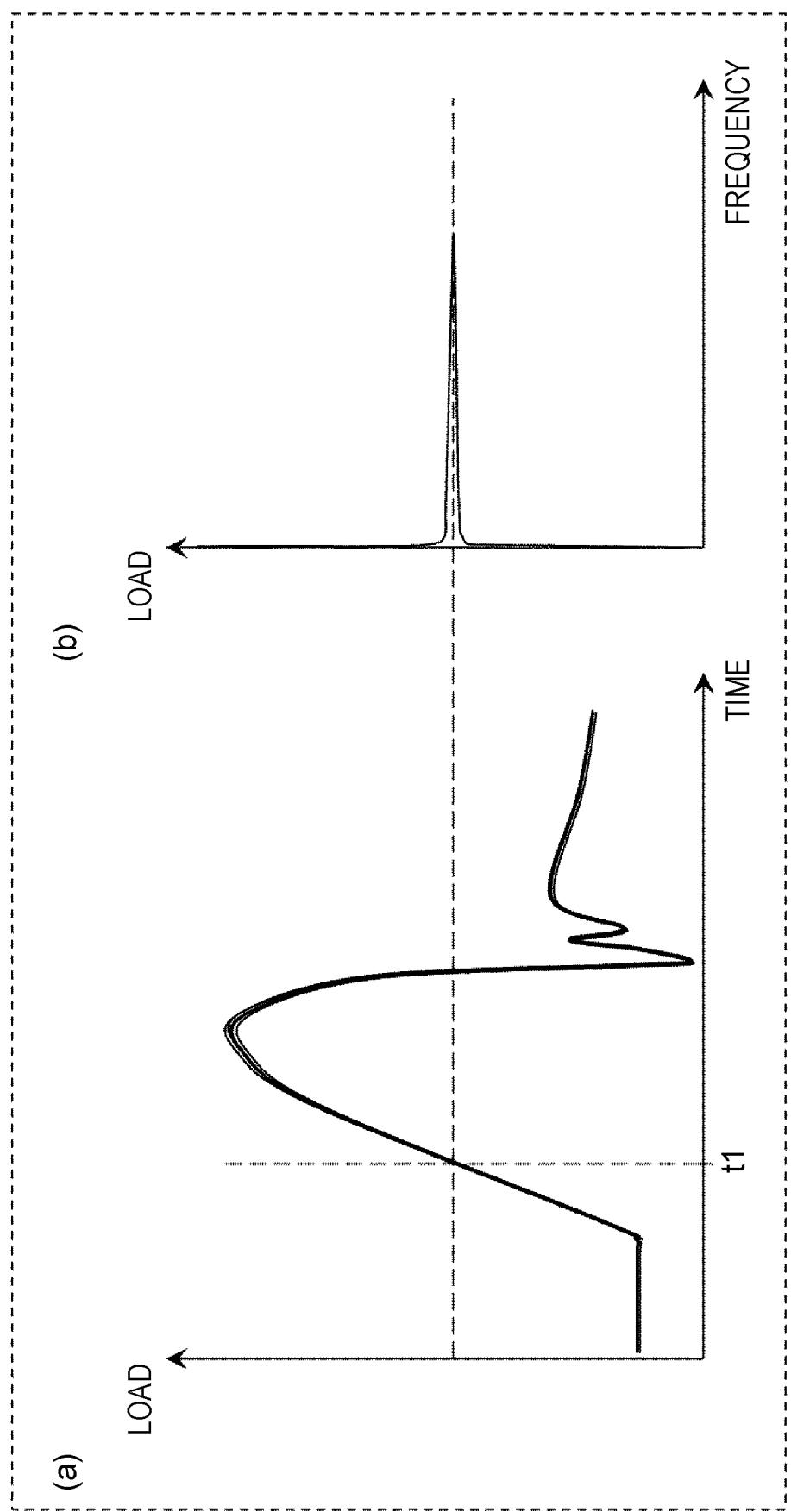
FIG. 5 is a graph indicating a result of resampling processing executed by the resampling unit in FIG. 1.

FIG. 5 is a graph indicating that the variation in the waveform characterizing the punching in the second shot data is reduced as a result of the resampling processing. Part (a) of FIG. 5 is a graph in which the second shot data as illustrated in part (b) of FIG. 4, acquired in various cycles of the cycle machining, is displayed in a superimposing manner. In part (a) of FIG. 5, only the peak position and its peripheral portions of the second shot data are enlarged and displayed. Part (b) of FIG. 5 is a graph indicating the frequency of the load at sampling time t1 for the plurality of second shot data illustrated in part (a) of FIG. 5. In part (b) of FIG. 5, the horizontal axis represents a frequency, and the vertical axis represents a load or a signal level corresponding to the load.

Sampling time t1 indicated in part (a) of FIG. 5 is a rising portion of the waveform. In the related art, the rising portion of the waveform is a portion where a change in the waveform noticeably appears in such a case where an abnormality occurs in the cycle machining, or a case where fluctuation occurs in the machining time of the cycle machining.

As described above, resampling unit 10 matches the data length of the second shot data subject to determination with the data length of determination reference data 131 that is the basis of the determination. In this way, resampling unit 10 can match the waveforms at or near the respective peak positions being characteristics in the cycle machining, or the like, among the plurality of pieces of waveform data respectively corresponding to the plurality of cycles even when fluctuation occurs in the machining time of the cycle machining. Accordingly, as illustrated in part (b) of FIG. 5, the frequency of the load at sampling time t1 among the plurality of pieces of waveform data has a steep peak. That is, resampling unit 10 can reduce the standard deviation of the load at sampling time t1 among the plurality of pieces of waveform data.

As a result, when determination on abnormality detection or the like for the second shot data is performed by setting, for example, the upper limit value and the lower limit value using the waveform data of determination reference data 131 as a reference, machining step monitoring apparatus 100 can perform the determination with high accuracy even by setting the difference between the upper limit value and the lower limit value to be narrow. The determination may be performed based on, for example, statistical data such as cosine similarity and a Mahalanobis distance, in addition to using the upper limit value and the lower limit value. Even in such a case, machining step monitoring apparatus 100 can reduce the influence of fluctuation in the machining time and perform determination with high accuracy.

Output unit 12 outputs a determination result obtained by determination processor 11. Output unit 12 is, for example, a display that displays a determination result. In this way, the user who handles the machining machine can know the determination result. Alternatively, output unit 12 may output the determination result to the machining machine. For example, when a determination result indicating an abnormality is input, the machining machine can stop the operation to prevent manufacturing of an abnormal finished good, a failure of the machining machine, an accident caused by abnormal operation, and the like.

Effects and Others

As described above, machining step monitoring apparatus 100 according to the present exemplary embodiment monitors a machining machine performing cycle machining that repeats a single cycle, and determines whether the machining machine is operating normally. Machining step monitoring apparatus 100 includes data segmentation unit 8, resampling unit 10 that is an example of a data length adjuster, and determination processor 11. Data segmentation unit 8 defines machining start time and machining end time of each single cycle, and segments the first shot data from the machining start time to the machining end time for each single cycle, from a first physical quantity that temporally changes during the cycle machining in the machining machine. Resampling unit 10 generates the second shot data by adjusting the data length of the first shot data to match with the data length of determination reference data 131. Determination reference data 131 is information indicating, as a reference, a change in the first physical quantity during the single cycle in the case where the machining machine is normally operating. Determination processor 11 compares the second shot data with determination reference data 131 to determine whether the machining machine is normally operating. The first physical quantity is, for example, a load.

According to the above configuration, even when fluctuation occurs in the machining time of each single cycle in the cycle machining, resampling unit 10 matches the data length of the second shot data with the data length of determination reference data 131. Therefore, whether the machining machine is operating normally can be more accurately determined than the configuration in the related art.

Data segmentation unit 8 may define the machining start time and the machining end time, based on a second physical quantity that changes at the machining start time and the machining end time in the machining machine. The second physical quantity is information indicating a position of a member of the machining machine, which moves to apply a load to a workpiece during the single cycle. The information is, for example, a height of a stripper plate of a press machine.

According to the above configuration, the machining start time and the machining end time of each single cycle in the cycle machining can be accurately aligned with one another, and resampling unit 10 can more accurately match the data length of the second shot data with the data length of determination reference data 131.

Machining step monitoring apparatus 100 may further include oversampling filter 9. Oversampling filter 9 interpolates data between a plurality of data points indicating a temporal change in the first physical quantity included in the first shot data. Resampling unit 10 generates the second shot data, by adjusting the data length of the first shot data to match with the data length of determination reference data 131 by using the plurality of data points and the data interpolated by oversampling filter 9.

According to the above configuration, the processing of interpolating data is executed, and thus the volume of data to be acquired of the first physical quantity can be reduced. Therefore, the speed of the determination processing can be increased by reducing the volume of data to reduce the throughput while the configuration of machining step monitoring apparatus 100 can be simplified to reduce costs.

Second Exemplary Embodiment

Figure 6:
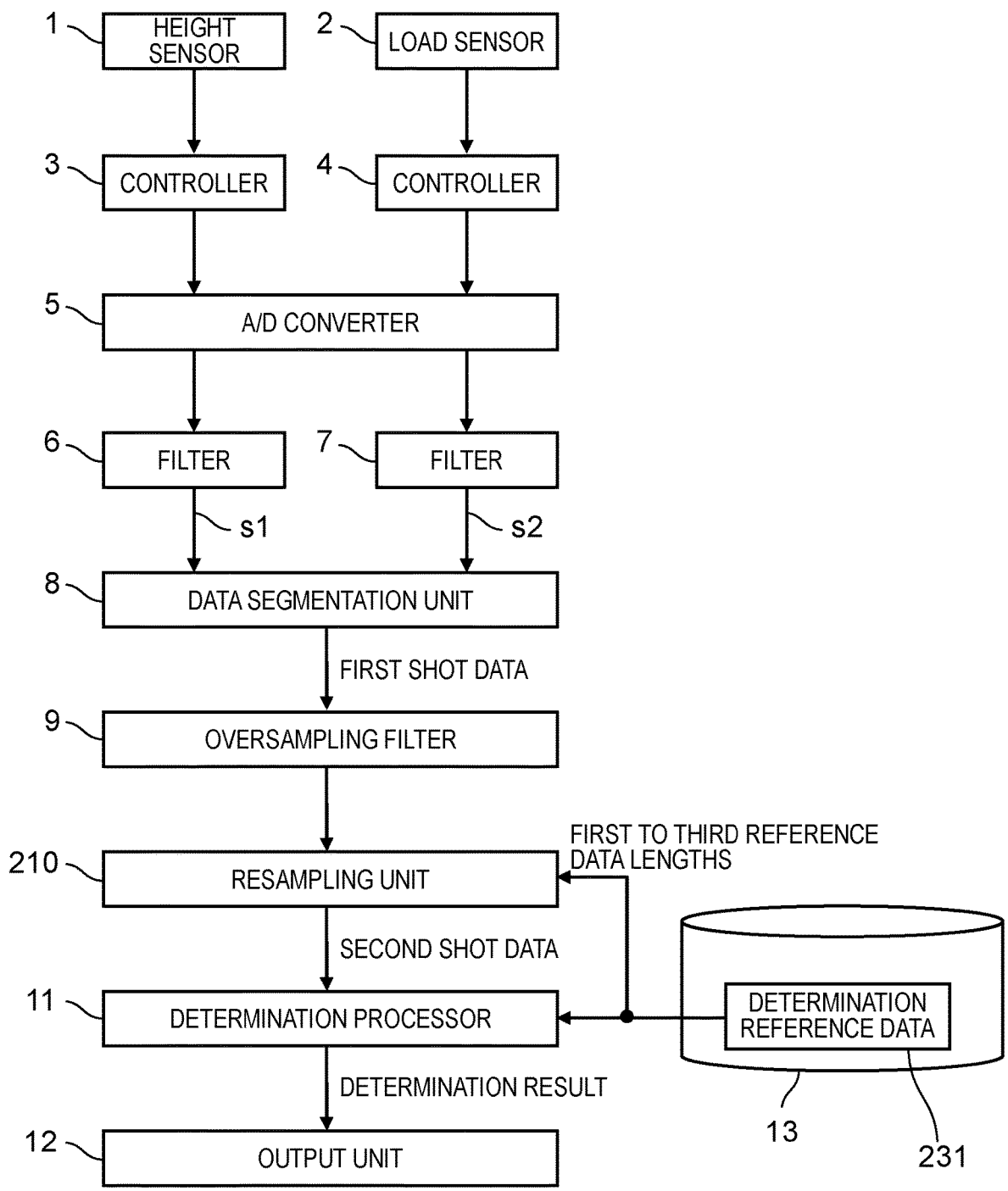
FIG. 6 is a block diagram illustrating a configuration example of a machining step monitoring apparatus according to a second exemplary embodiment of the present disclosure.

FIG. 6 is a block diagram illustrating a configuration example of machining step monitoring apparatus 200 according to a second exemplary embodiment of the present disclosure. Machining step monitoring apparatus 200 in FIG. 6 includes resampling unit 210 instead of resampling unit 10 as compared with machining step monitoring apparatus 100 in FIG. 1. Further, storage 13 of machining step monitoring apparatus 200 in FIG. 6 stores determination reference data 231 instead of determination reference data 131 in FIG. 1.

Resampling unit 210 compresses at least part of the data output from oversampling filter 9. For example, resampling unit 210 does not compress a waveform portion representing a characteristic of machining in the first shot data, and compresses only other waveform portions.

Figure 7:
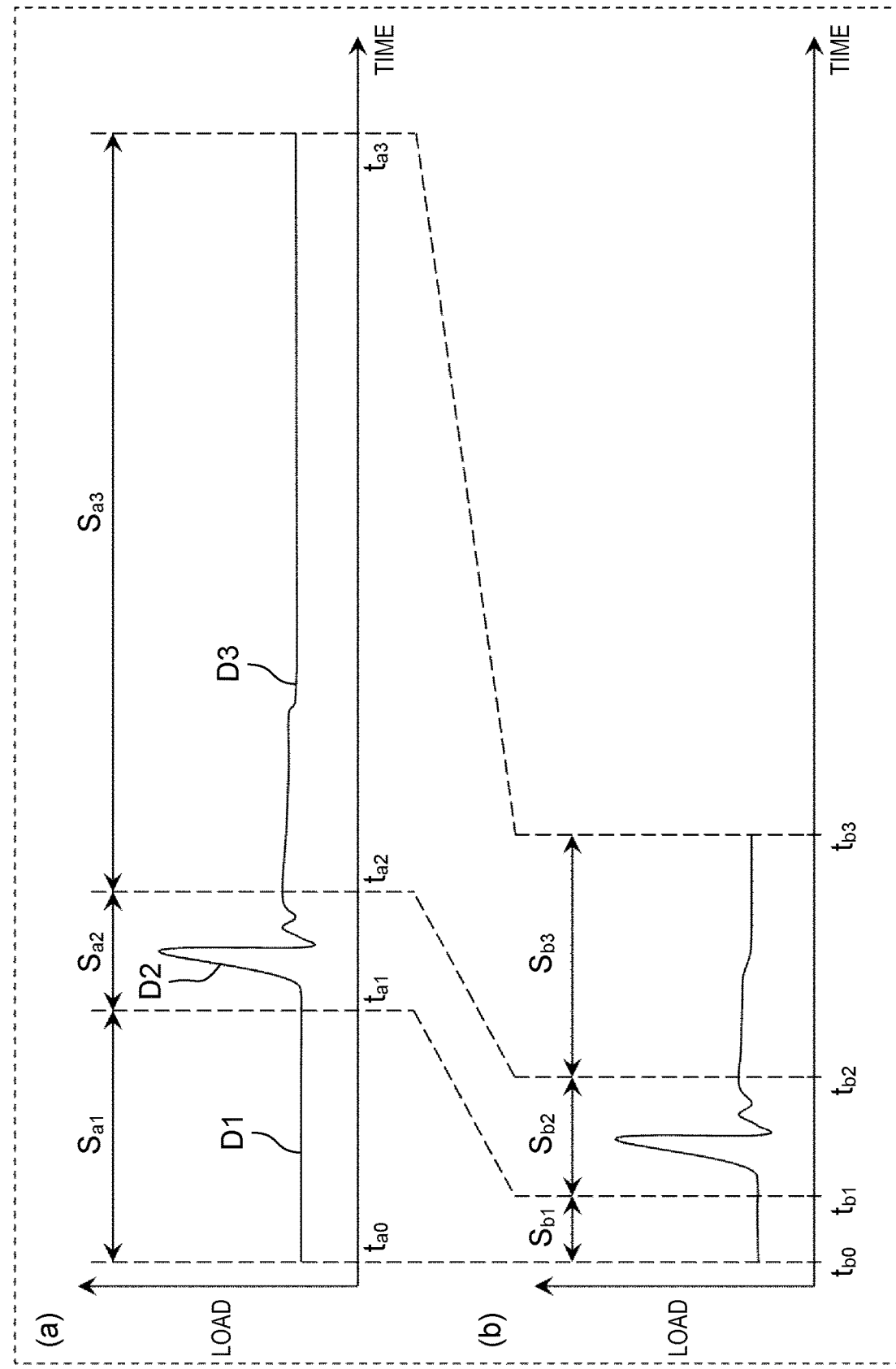
FIG. 7 is a schematic diagram for explaining compression processing executed by a resampling unit in FIG. 6.

FIG. 7 is a schematic diagram for explaining compression processing executed by resampling unit 210 in FIG. 6. Part (a) of FIG. 7 is a graph indicating data input to resampling unit 210.

In the present exemplary embodiment, the first shot data is divided into a plurality of n sections (here, n is an integer of 2 or more). In the example illustrated in part (a) of FIG. 7, the first shot data is divided into data D1 in first section $S_{a1}$ from machining start time $t_{a0}$ to time $t_{a1}$, data D2 in second section $S_{a2}$ from time $t_{a1}$ to time $t_{a2}$, and data D3 in third section $S_{a3}$ from time $t_{a2}$ to machining end time $t_{a3}$. The division is performed by data segmentation unit 8 or resampling unit 210. In the example illustrated in part (a) of FIG. 7, first section $S_{a1}$ represents a section from the start of machining until the punch reaches the workpiece as a result of descent of the punch. Second section $S_{a2}$ corresponds to a section during which the material is being punched by the punch. Third section $S_{a3}$ corresponds to a section from the time when the punch completes the punching of the material to the end of the machining.

The lengths of sections $S_{a1}$, $S_{a2}$, $S_{a3}$, namely, the values of time $t_{a1}$, $t_{a2}$, $t_{a3}$ are set in advance according to the type of machining by the machining machine. For example, in the cycle machining by the press machine, the timing at which the punch punches the material in each machining cycle can be fixed within a certain range in accordance with the configuration of the metal mold when machining start time $t_{a0}$ is set as a reference. Therefore, the ratio of the lengths of sections $S_{a1}$, $S_{a2}$, $S_{a3}$ can be set to a fixed value. In the example illustrated in part (a) of FIG. 7, the ratio of the lengths of sections $S_{a1}$, $S_{a2}$, $S_{a3}$ is set to 2:1:7.

The first shot data is preferably divided into a portion having a large temporal change (in the example illustrated in part (a) of FIG. 7, second section $S_{a2}$) and a portion having a small temporal change (in the example illustrated in part (a) of FIG. 7, first section $S_{a1}$ and third section $S_{a3}$).

Part (b) of FIG. 7 is a graph indicating compressed data compressed by executing the compression processing by resampling unit 210 on the oversampled first shot data in part (a) of FIG. 7. The compressed data includes first section $S_{b1}$ from machining start time $t_{b0}$ to time $t_{b1}$, second section $S_{b2}$ from time $t_{b1}$ to time $t_{b2}$, and third section $S_{b3}$ from time $t_{b2}$ to machining end time $t_{b3}$. Sections $S_{b1}$, $S_{b2}$, $S_{b3}$ after compression respectively correspond to sections $S_{a1}$, $S_{a2}$, $S_{a3}$ before compression in part (a) of FIG. 7.

Resampling unit 210 compresses a portion having a small temporal change in the oversampled first shot data, whereas resampling unit 210 does not compress a portion having a large temporal change or compresses the same at a smaller compression ratio than that for a portion having a small temporal change. For example, resampling unit 210 compresses the oversampled waveform data in sections $S_{a1}$, $S_{a2}$, $S_{a3}$ in part (a) of FIG. 7 at respective compression ratios C1, C2, C3, to obtain compressed data of respective sections $S_{b1}$, $S_{b2}$, $S_{b3}$ in part (b) of FIG. 7. Here, the compression ratio is a proportion of the volume of data before compression to the volume of data after compression.

For example, resampling unit 210 compresses the data of each section at respective one of compression ratios different from one another by allocating, to the data of each section, respective one of the numbers of samples corresponding to time lengths different from one another.

In the example of FIG. 7, C1=4, C2=1, and C3=3. That is, the waveform data in first section $S_{a1}$ in part (a) of FIG. 7 is compressed to ¼ to be the compressed data of first section $S_{b1}$ in part (b) of FIG. 7, and the waveform data in third section $S_{a3}$ in part (a) of FIG. 7 is compressed to ⅓ to be the compressed data of third section $S_{b3}$ in part (b) of FIG. 7. In these sections, the number of samples is reduced. On the other hand, the waveform data in second section $S_{a2}$ in part (a) of FIG. 7 is not compressed.

Determination reference data 231 in FIG. 6 is divided into reference sections respectively corresponding to sections $S_{b1}$, $S_{b2}$, $S_{b3}$ in FIG. 7. That is, determination reference data 231 is also divided into a plurality of n reference sections. Further, the reference sections of determination reference data 231 in FIG. 6 are compressed at respective compression ratios C1, C2, C3 of the compression performed on respective sections $S_{a1}$, $S_{a2}$, $S_{a3}$ in part (a) of FIG. 7 as compared with determination reference data 131 in FIG. 1. The reference sections of determination reference data 231 have respective reference data lengths. These data lengths are respectively referred to as a first reference data length, a second reference data length, and a third reference data length.

The first to third reference data lengths of determination reference data 231 are input to resampling unit 210. Resampling unit 210 executes, on the compressed data, resampling processing of matching the data length of each of sections $S_{b1}$, $S_{b2}$, $S_{b3}$ with the corresponding one of first to third reference data lengths, and generates second shot data.

In the present exemplary embodiment, resampling unit 210 can execute the resampling processing even when the sampling period before and after the resampling is set to be largely different.

As described above, in machining step monitoring apparatus 200 according to the present exemplary embodiment, determination reference data 131 may have a plurality of n reference sections divided at a predetermined proportion in terms of time length. Resampling unit 210 divides the first shot data into a plurality of n sections at a predetermined proportion in terms of time length. Further, resampling unit 210 generates the second measurement data by adjusting each of the data lengths of the first shot data in the plurality of n sections to match with the data length of determination reference data 131 in the corresponding one of plurality of n reference sections.

Machining step monitoring apparatus 200 as described above exhibits a higher effect when the time length of a machining point (for example, a punching period) characterizing machining is small with respect to the entire machining time of each single cycle in cycle machining. That is, in the punching by the press machine, machining step monitoring apparatus 200 can not only grasp the state of a tool such as a punch in detail by setting, as a target to be measured, the physical quantity such as the punching load applied to the tool, but also grasp the state over the entire machining time as for operation such as pressing the workpiece by the stripper plate and pushing the scrap into the die. In addition, both a partially detailed state and an entire state can be grasped by compressing data for an appropriate portion of the entire machining time of each single cycle as in the present exemplary embodiment. Furthermore, by compressing data, the volume of data to be acquired and the data throughput can be reduced, and the determination processing can be speeded up.

Accordingly, machining step monitoring apparatus 200 can execute the determination processing by using data having small volume of data, in which the data of a portion having a large change that characterizes machining is not compressed and a portion having a slow change is compressed. Therefore, the determination result can be obtained at a higher speed without deteriorating the accuracy of determination. In addition, according to machining step monitoring apparatus 200, the entire abnormality detection from the machining start to the machining end can be performed at a time. According to machining step monitoring apparatus 200, a determination method using the Mahalanobis distance, which is a determination method based on a correlation between sampling values at two different times, can obtain a higher effect.

Resampling unit 210 may adjust, by compressing the first measurement data in at least one section of the plurality of n sections, the data length of the first measurement data in the at least one section to match with the data length of determination reference data 131 in the corresponding reference section.

According to the above configuration, by compressing data, the volume of data to be acquired and the data throughput can be reduced, and the determination processing can be speeded up.

(Modification of Second Exemplary Embodiment)

Hereinafter, a modification of the second exemplary embodiment of the present disclosure will be described with reference to FIG. 8. In the present modification, height sensor 1 in FIG. 6 measures the height of the slider of the crank press machine. For example, height sensor 1 measures the die height. The die height is, for example, a distance from the lower face of the slider to the upper face of the bolster plate. The height of the slider is an example of a "second physical quantity" in the present disclosure.

Figure 8:
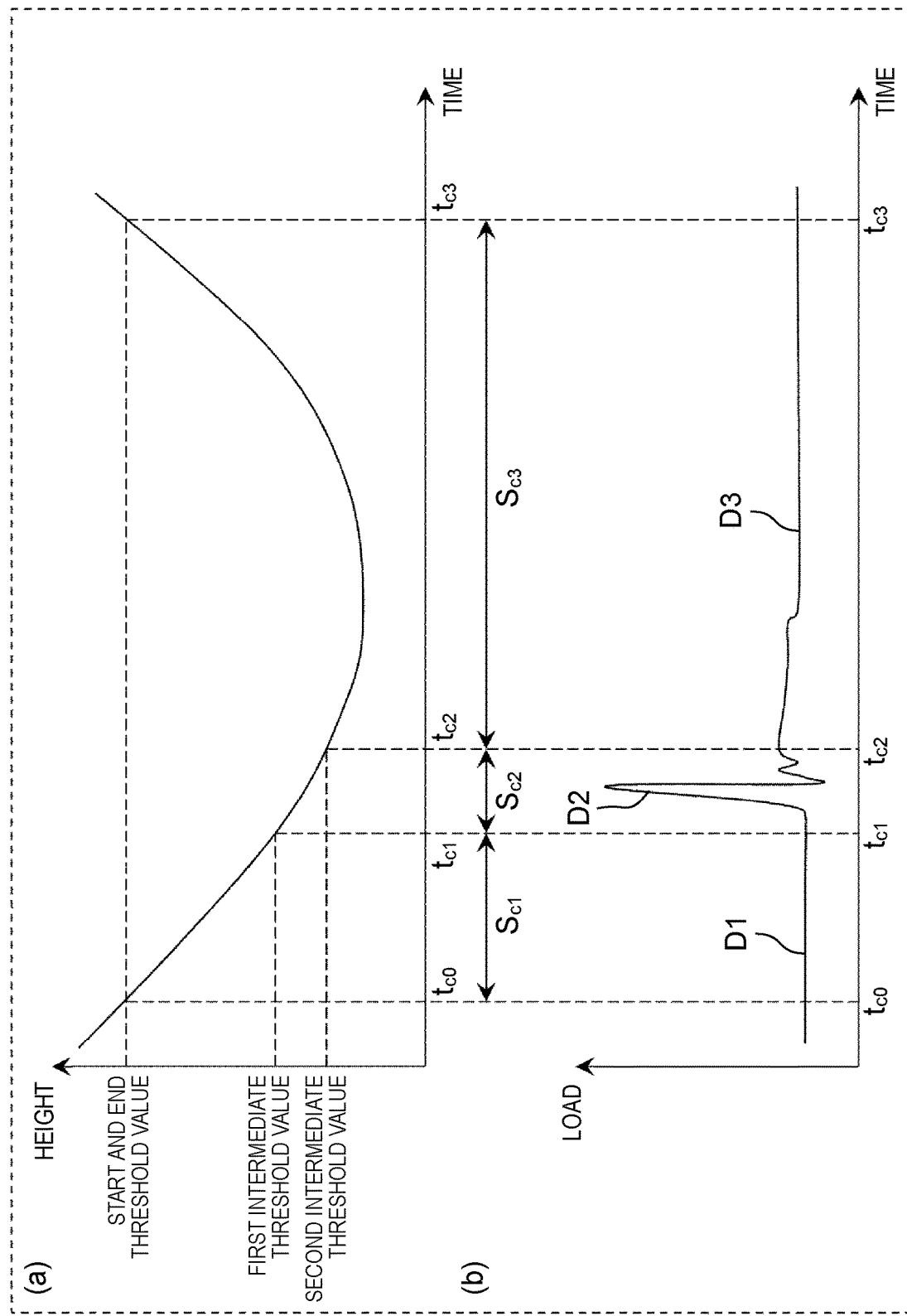
FIG. 8 is a schematic diagram for explaining a modification of the second exemplary embodiment of the present disclosure.

Part (a) of FIG. 8 is a graph indicating a temporal change in the height of the slider measured by height sensor 1. Part (b) of FIG. 8 is a graph indicating a temporal change in the load applied to the punch measured by load sensor 2.

As illustrated in part (a) of FIG. 8, the temporal change in the slider height of the crank press machine has a shape close to a sine wave. The punching of the workpiece is performed at a time point between the machining start time and the time when the slider descends to the bottom dead center.

Data segmentation unit 8 or resampling unit 210 defines time $t_{c1}$ at which the slider height in part (a) of FIG. 8 falls below the first intermediate threshold value and time $t_{c2}$ at which the slider height in part (a) of FIG. 8 falls below the second intermediate threshold value smaller than the first intermediate threshold value. The first intermediate threshold value and the second intermediate threshold value are stored in advance in storage 13, for example. As described in the first exemplary embodiment, machining start time $t_{c0}$ at which the intensity of signal s1 originating from height sensor 1 falls below the start threshold value, and machining end time $t_{c3}$ at which the intensity of signal s1 exceeds the end threshold value are defined by data segmentation unit 8.

In this way, the first shot data is divided into data D1 in first section $S_{c1}$ from machining start time $t_{c0}$ to time $t_{c1}$, data D2 in second section $S_{c2}$ from time $t_{c1}$ to time $t_{c2}$, and data D3 in third section $S_{c3}$ from time $t_{c2}$ to machining end time $t_{c3}$. In the example illustrated in FIG. 8, first section $S_{c1}$ represents a section from the start of machining until the punch reaches the workpiece as a result of descent of the punch. Second section $S_{c2}$ corresponds to a section during which the material is being punched by the punch. Third section $S_{c3}$ corresponds to a section from the time when the punch completes the punching of the material to the end of the machining.

As described above, in the present modification, resampling unit 210 divides the first shot data at a plurality of time points at which the measured slider height falls below a corresponding one of a plurality of threshold values different from one another. The plurality of threshold values are, for example, the first intermediate threshold value and the second intermediate threshold value.

In the second exemplary embodiment, the lengths of sections $S_{a1}$, $S_{a2}$, $S_{a3}$ in part (a) of FIG. 7, that is, the values of time $t_{a1}$, $t_{a2}$, $t_{a3}$ are defined in advance, whereas in the present modification, the lengths are defined by using the detection result of the slider height obtained by height sensor 1. Each of sections $S_{a1}$, $S_{a2}$, $S_{a3}$ is divided in synchronization with the waveform detected by height sensor 1. Thus, a respective one of divided domains can be accurately obtained even when fluctuation occurs in the machining time of each single cycle in the cycle machining. Accordingly, the effect in which the temporal fluctuation is corrected for each section can be obtained by the division synchronized with the waveform detected by height sensor 1. Thus, the frequency of the load at the specific sampling time as illustrated in part (b) of FIG. 5 can be made into a steeper frequency with less variation, that is, a frequency having a smaller standard deviation. Therefore, according to the present modification, an abnormality can be detected more accurately.

Third Exemplary Embodiment

Figure 9:
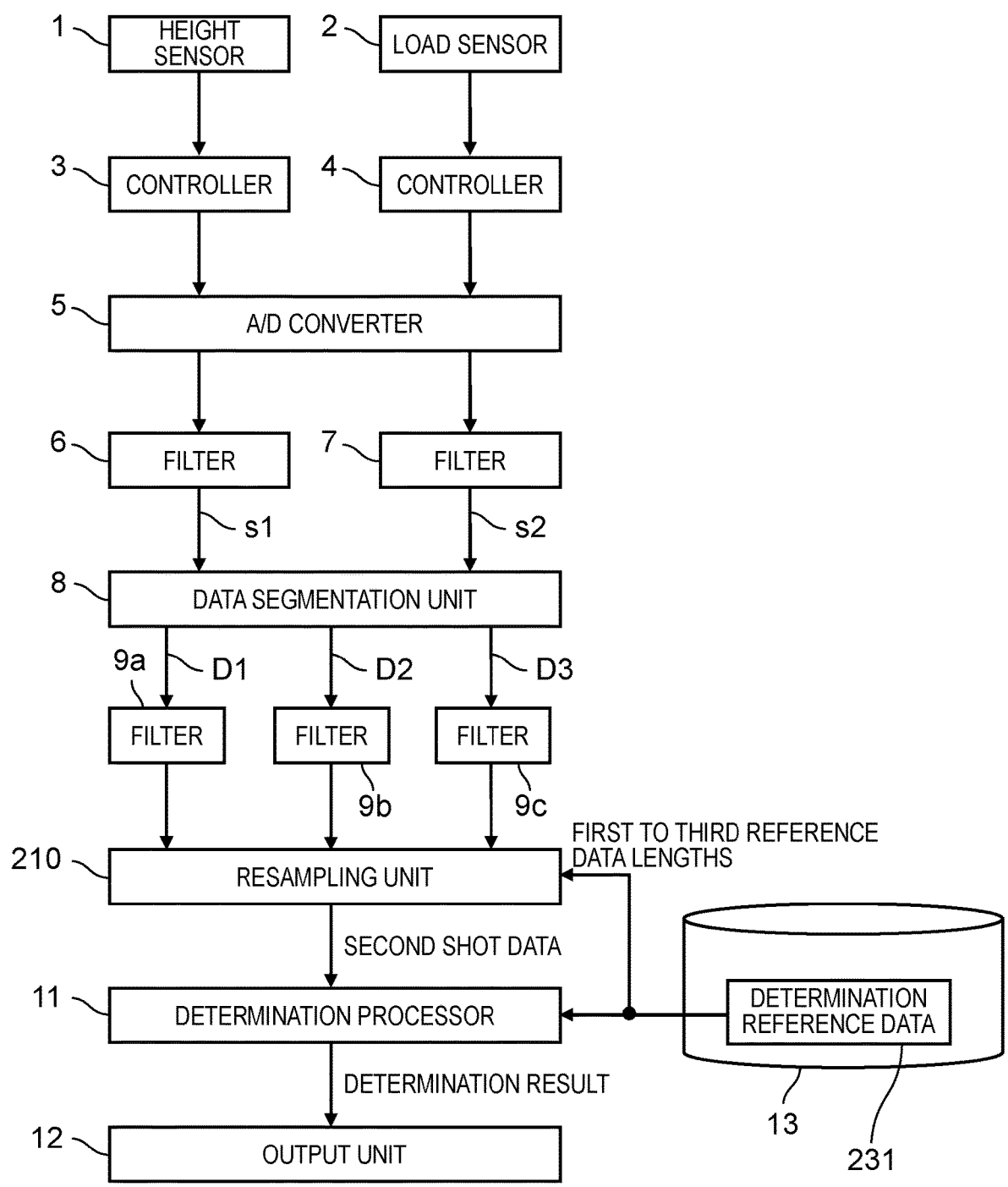
FIG. 9 is a block diagram illustrating a configuration example of a machining step monitoring apparatus according to a third exemplary embodiment of the present disclosure.

FIG. 9 is a block diagram illustrating a configuration example of machining step monitoring apparatus 300 according to a third exemplary embodiment of the present disclosure. Machining step monitoring apparatus 200 in FIG. 6 includes one oversampling filter 9, whereas machining step monitoring apparatus 300 in FIG. 9 includes a plurality of oversampling filters. In the illustrated example, machining step monitoring apparatus 300 includes three oversampling filters 9a, 9b, 9c.

Oversampling filters 9a, 9b, 9c are, for example, low-pass filters each having respective cutoff frequencies set independently of one another. That is, the cutoff frequencies of oversampling filters 9a, 9b, 9c may be different from or identical to one another.

Data D1 in first section $S_{a1}$ from machining start time $t_{a0}$ to time $t_{a1}$ (see part (a) of FIG. 7) is input to oversampling filter 9a. Data D2 in second section $S_{a2}$ from time $t_{a1}$ to time $t_{a2}$ is input to oversampling filter 9b. Data D3 in third section $S_{a3}$ from time $t_{a2}$ to machining end time $t_{a3}$ is input to oversampling filter 9c.

The cutoff frequencies of oversampling filters 9a, 9b, 9c are adjusted in accordance with respective compression ratios C1, C2, C3 of input data D1, D2, D3. For example, when the waveform data in first section $S_{a1}$ is compressed to ¼ (in the case of C1=4), the cutoff frequency of oversampling filter 9a is set to ¼ of the Nyquist frequency. When the waveform data in first section $S_{b1}$ is not compressed (in the case of C2=1), the cutoff frequency of oversampling filter 9b is set to the Nyquist frequency. When the waveform data in first section $S_{c1}$ is compressed to ⅓ (in the case of C3=3), the cutoff frequency of oversampling filter 9c is set to ⅓ of the Nyquist frequency.

In a case where there is only one oversampling filter, a high frequency component due to a sampling frequency before compression is included, and a value including a high frequency component may be acquired when a value at timing closest to a sampling point before resampling on a time axis is acquired to obtain a resampling point. On the other hand, according to the present exemplary embodiment including the plurality of oversampling filters 9a, 9b, 9c, oversampling filters 9a, 9b, 9c satisfying the sampling definition can be easily prepared, and an accurate value from which the high frequency component is removed can be acquired in the resampling.

Therefore, machining step monitoring apparatus 300 can obtain measurement data including a correct frequency component by compressing the volume of data while satisfying the sampling definition, and can more accurately detect an abnormality by determination processor 11.

In the present exemplary embodiment, an example has been described in which the number of types of the oversampling filter is identical to the number of sections, and the oversampling filters correspond one-to-one to the sections, but the present exemplary embodiment is not limited thereto. For example, when compression ratios respectively applied to a plurality of sections are substantially identical to one another, one oversampling filter may be provided for the plurality of sections.

Furthermore, in a case where the compression ratio applied to a certain section is high, for example, in a case where a compression ratio of eight times or more is applied, the compression itself has a function as oversampling. Thus, it is not always necessary to oversample the data of the section with sampling frequency Fs or more.

As described above, machining step monitoring apparatus 300 according to the present exemplary embodiment may further include a plurality of n oversampling filters respectively corresponding to a plurality of n sections. Each of the plurality of n oversampling filters executes oversampling processing on a plurality of data points indicating a temporal change in the first physical quantity included in the first measurement data in the respective one of the plurality of n sections. The plurality of n oversampling filters have cutoff frequencies independent of one another.

According to the above configuration, even when the input data is compressed, resampling unit 210 can resample the input data while satisfying the sampling definition. Therefore, machining step monitoring apparatus 300 can easily obtain measurement data including a correct frequency component by compressing the volume of data while satisfying the sampling definition, and can more accurately detect an abnormality by determination processor 11.

Resampling unit 210 may adjusts, by compressing the first measurement data in at least one section of the plurality of n sections on a predetermined compression ratio, the data length of the first measurement data in the at least one section to match with the data length of determination reference data 131 in the corresponding reference section. The cutoff frequency of each of the plurality of n oversampling filters is set based on the compression ratio.

According to the above configuration, both a partially detailed state and an entire state can be grasped by compressing data for an appropriate portion of the entire machining time of each single cycle, in addition to the above-described effects of machining step monitoring apparatus 300. Furthermore, by compressing data, the volume of data to be acquired and the data throughput can be reduced, and the determination processing can be speeded up.

Other Exemplary Embodiments

As described above, the exemplary embodiments have been explained as the examples of the technique disclosed in the present application. However, the technique according to the present disclosure is not limited to these exemplary embodiments, and is applicable to exemplary embodiments in which changes, replacements, additions, omissions, or the like have been made as appropriate. Moreover, a new exemplary embodiment can be made by combining the respective components described in the above exemplary embodiments. Hereinafter, other exemplary embodiments will be described as examples.

In the above exemplary embodiments, the configuration in which the two signals detected by height sensor 1 and load sensor 2 are processed has been described. However, the present disclosure is not limited to this configuration, and any configuration may be employed as long as the start timing of machining and the end timing of machining can be detected based on at least one signal. Therefore, the number of sensors for detecting the physical quantity is not limited to two, and may be one, or three or more. The at least one signal is not limited to a signal(s) obtained by height sensor 1 or load sensor 2, and may be, for example, a signal from a controller such as a programmable logic controller (PLC) or a signal indicating a rotation angle, a position, or the like of the press machine.

In the above exemplary embodiments, the example in which the first shot data is oversampled eight times has been described. However, the oversampling factor may be larger than one, and is not limited to eight. When the oversampling factor is large, volume of data and computational complexity are increased, but an interpolated value with a small error can be acquired. In consideration of this trade-off, the oversampling factor is desirably about eight.

In the above exemplary embodiments, the oversampling filter has been described as an example of the data interpolator, but the data interpolator is not limited thereto. Any data interpolator may be used as long as a sampling value obtained by interpolating between a plurality of data points can be obtained. For example, the data interpolator may perform linear interpolation between two sampled points or curve interpolation based on sampling values of three or more points.

In the above exemplary embodiments, determination reference data 131 has been described as waveform data serving as a reference in performing determination. However, determination reference data 131 is not limited thereto, and may be any data having a reference data length. Determination reference data 131 may be a learned model generated by learning a plurality of pieces of time-series data each having the reference data length through machine learning. By using such a learned model, determination processor 11 may output the determination result for the input of the time-series data having the data length identical to the reference data length, namely, for the input of the second shot data.

As in the second exemplary embodiment and the third exemplary embodiment, the effect of performing the determination processing by using the compressed and reduced data is remarkable when the learned model is used for the determination processing. This is because, in the machine learning of the time-series data, the size of the learned model to be generated tends to increase as the data length of the time-series data increases, and accordingly, the throughput required for inference using the learned model increases. In addition, there is a problem that it becomes more difficult to cause the model to perform appropriate learning as the data length increases. By using a waveform data compressed without machining characteristics being impaired, the above problems can be solved and determination can be performed at high speed.

According to the machining step monitoring apparatus and the machining step monitoring method according to the present disclosure, whether a machining machine is operating normally can be determined more accurately than those in the related art, even when fluctuation occurs in the machining time of each single cycle in cycle machining.

As described above, the exemplary embodiments have been described as examples of the technique according to the present disclosure. To this end, the accompanying drawings and detailed description are provided.

Therefore, in order to illustrate the above technique, the components illustrated in the accompanying drawings or described in the detailed description can include not only components essential for solving the problems but also components non-essential for solving the problems. For this reason, it should not be immediately construed that those non-essential components are essential only based on the fact that those non-essential components are illustrated in the accompanying drawings or described in the detailed description.

Note that the exemplary embodiments described above are provided to describe, as an example, the technique in the present disclosure. Therefore, various changes, replacements, additions, omissions, and the like can be made within the scope of the claims and equivalents thereof.

The present disclosure is applicable to a machining step monitoring apparatus and a machining step monitoring method that monitor a machining machine performing cycle machining that repeats a single cycle and determine whether the machining machine is operating normally.

What is claimed is:

1. A machining step monitoring apparatus configured to monitor a machining machine that performs cycle machining that repeats a single cycle, the machining step monitoring apparatus configured to determine whether the machining machine is operating normally, the machining step monitoring apparatus comprising:
 a data segmentation unit configured to define machining start time and machining end time of each single cycle, the data segmentation unit configured to segment, from a first physical quantity that temporally changes during the cycle machining in the machining machine, first measurement data indicating the first physical quantity from the machining start time to the machining end time for each single cycle;
 a data length adjuster configured to generate second measurement data by adjusting a data length of the first measurement data to match with a data length of determination reference data indicating, as a reference, a change in the first physical quantity during the single cycle in a case where the machining machine is normally operating; and a determination processor configured to compare the second measurement data with the determination reference data to determine whether the machining machine is normally operating.

2. The machining step monitoring apparatus according to claim 1, wherein the data segmentation unit defines the machining start time and the machining end time, based on a second physical quantity that changes at the machining start time and the machining end time in the machining machine.

3. The machining step monitoring apparatus according to claim 2, wherein
the machining machine performs machining by applying a load to a workpiece during the single cycle, and
the second physical quantity is information indicating a position of a member of the machining machine, the member moving to apply the load to the workpiece during the single cycle.

4. The machining step monitoring apparatus according to claim 1, further comprising a data interpolator configured to interpolate data between a plurality of data points indicating a temporal change in the first physical quantity included in the first measurement data, wherein the data length adjuster generates the second measurement data, by adjusting the data length of the first measurement data to match with the data length of the determination reference data by using the plurality of data points and the data interpolated by the data interpolator.

5. The machining step monitoring apparatus according to claim 4, wherein the data interpolator interpolates data between the plurality of data points by oversampling the plurality of data points.

6. The machining step monitoring apparatus according to claim 5, wherein the data length adjuster adjusts, by compressing the first measurement data in at least one section of a plurality of n sections, the data length of the first measurement data in the at least one section to match with the data length of the determination reference data in a corresponding reference section.

7. The machining step monitoring apparatus according to claim 5, further comprising a plurality of n oversampling filters respectively corresponding to the plurality of n sections, the plurality of n oversampling filters respectively executing oversampling processing on the plurality of data points indicating the temporal change in the first physical quantity included in the first measurement data in the plurality of n sections,
wherein the plurality of n oversampling filters respectively have cutoff frequencies independent of one another.

8. The machining step monitoring apparatus according to claim 7, wherein
the data length adjuster adjusts, by compressing the first measurement data in at least one section of the plurality of n sections at a compression ratio that is predetermined, the data length of the first measurement data in the at least one section to match with the data length of the determination reference data in a corresponding reference section, and the cutoff frequencies of the plurality of n oversampling filters are set based on the compression ratio.

9. The machining step monitoring apparatus according to claim 1, wherein
the determination reference data includes a plurality of n reference sections divided at a predetermined proportion in terms of time, and
the data length adjuster generates the second measurement data by dividing the first measurement data into a plurality of n sections at the predetermined proportion in terms of time, and by adjusting each of the data lengths of the first measurement data in the plurality of n sections to match the data length of the determination reference data in corresponding one of the plurality of n reference sections.

10. The machining step monitoring apparatus according to claim 9, wherein the data length adjuster divides the first measurement data at each of a plurality of time points, at which a value of a second physical quantity that changes at the machining start time and the machining end time in the machining machine fall below a corresponding one of a plurality of threshold values different from one another.

11. The machining step monitoring apparatus according to claim 1, wherein the data length adjuster adjusts, by resampling the first measurement data, the data length of the first measurement data to match with the data length of the determination reference data.

12. The machining step monitoring apparatus according to claim 1, further comprising an output unit configured to output a determination result obtained by the determination processor.

13. The machining step monitoring apparatus according to claim 1, wherein the machining machine is a press machine.

14. The machining step monitoring apparatus according to claim 1, wherein the first physical quantity is a load detected by a load sensor.

15. A machining step monitoring method of monitoring a machining machine that performs cycle machining that repeats a single cycle, and of determining whether the machining machine is operating normally, the machining step monitoring method comprising:
sequentially acquiring a first physical quantity that temporally changes during the cycle processing in the machining machine;
defining machining start time and machining end time of each single cycle, and segmenting, from the first physical quantity, first measurement data indicating the first physical quantity from the machining start time to the machining end time for each single cycle;
generating second measurement data by adjusting a data length of the first measurement data to match with a data length of determination reference data indicating, as a reference, a change in the first physical quantity during the single cycle in a case where the machining machine is normally operating; and
comparing the second measurement data with the determination reference data to determine whether the machining machine is normally operating.

* * * * *